United States Patent
Gestrelius et al.

(10) Patent No.: US 6,236,986 B1
(45) Date of Patent: *May 22, 2001

(54) METHOD AND DEVICE FOR EXTRACTING INFORMATION FROM A DATABASE

(75) Inventors: Staffan Gestrelius, Hjärup; Håkan Fransson; Björn Berg, both of Lund, all of (SE)

(73) Assignee: Qliktech International AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,403
(22) PCT Filed: Sep. 21, 1995
(86) PCT No.: PCT/SE95/01071
§ 371 Date: May 21, 1997
§ 102(e) Date: May 21, 1997
(87) PCT Pub. No.: WO96/09589
PCT Pub. Date: Mar. 28, 1996

(30) Foreign Application Priority Data

Sep. 21, 1994 (SE) .................................................. 9403175

(51) Int. Cl.[7] .................................................... G06F 17/30
(52) U.S. Cl. ............................................. 707/3; 707/203
(58) Field of Search ................................ 707/3, 205, 10, 707/203, 1–2, 4, 103, 5

(56) References Cited

U.S. PATENT DOCUMENTS 3,971,916 * 7/1976 Moreno ................................ 235/61.7
4,068,298 * 1/1978 Dechant et al. ...................... 364/200
4,979,039 * 12/1990 Kisor et al. .......................... 348/422
5,159,610 * 10/1992 Eyuboglu et al. ..................... 375/18

(List continued on next page.)

FOREIGN PATENT DOCUMENTS

| 0380240 A2 | 8/1990 | (EP) | G06F/15/401 |
| 0420424 A2 | 4/1991 | (EP) | G06F/15/401 |
| 62-121532 | 6/1987 | (JP) | G06F/7/24 |
| WO 96/09589 | 3/1996 | (WO) . | |

OTHER PUBLICATIONS

Patent Abstracts of Japan, vol. II, No. 340, P–634, abstract of JP A 62–121532 (Hitachi) Jun. 2, 1987.

U.S. Ser. No. 08/809,403, filed Dec. 1, 1997, entitled "Method and Device for Extracting Information from a Database".

Pankova, L.A. et al., Reducing The Query–Processing Time In Relational Data Base Management Systems, 1985.

PCT International Search Report.

*Primary Examiner*—Kim Vu
*Assistant Examiner*—Jean Bolte Fleurantin
(74) *Attorney, Agent, or Firm*—Fish & Richardson P.C.

(57) ABSTRACT

The present invention relates to a method and a device for extracting information from a database, which comprises a plurality of data records, each data record comprising at least two data elements, each data element being defined by a data element type and a data element value. First, the data records are read into the primary memory of a computer, so that all processing of the data may be done off-line. Then, the data element values are binary-coded and stored in one or more tables. When the selection of at least one data element value is detected, all binary-coded data element values are examined to obtain all data records implied by selection. Due to the binary-coding, these data records are found very quickly. Finally the data element values implied by the selection is kept track of in a status set.

13 Claims, 3 Drawing Sheets

U.S. PATENT DOCUMENTS

| | | | |
|---|---|---|---|
| 5,261,039 | 11/1993 | Miyazaki | 358/1.1 |
| 5,261,093 | 11/1993 | Asmuth | 707/2 |
| 5,293,616 * | 3/1994 | Flint | 707/3 |
| 5,465,353 * | 11/1995 | Hull et al. | 707/103 |
| 5,572,195 * | 11/1996 | Heller et al. | 340/825.35 |
| 5,596,752 * | 1/1993 | Knudsen et al. | 395/701 |
| 5,649,196 * | 7/1995 | Woodhill et al. | 395/620 |
| 5,799,312 * | 8/1998 | Rigoustsos | 707/103 |
| 5,802,525 * | 9/1998 | Rigoutsos | 707/103 |

* cited by examiner

METHOD AND DEVICE FOR EXTRACTING INFORMATION FROM A DATABASE

TECHNICAL FIELD

The present invention relates to a method and a device for extracting information from a database, which comprises a plurality of data records, each data record comprising at least two data elements, each data element being defined by a data element type and a data element value.

BACKGROUND OF THE INVENTION

A well-known method for interacting with a database is to use the Structured Query Language (SQL). To extract information from the database, questions in the form of SELECT statements are asked to the database. Basically, the answer to a SELECT statement is a number of data records forming a table.

One disadvantage of SQL is that it presupposes knowledge about the tabular structure of the database. More particularly, the user has to state in the SELECT statement which tables the information is to be retrieved from. For instance, assume that the database comprises information about clothes and that the information is stored in two tables, the first table of which comprises the types of clothes and the sizes thereof, and the second table of which comprises the types of clothes and the prices. To extract all types of clothes having a predetermined size and a predetermined price, a complicated SELECT statement specifying the names of the two tables and of the fields of the tables including the types of clothes, the prices and the sizes, as well as the value of the predetermined price and the predetermined size, has to be used.

Furthermore, when the information to be retrieved is present in a column of which the data element values are not indexed, the column has to be searched linearly, which results in long response times when the column includes many data element values. This is a serious drawback, especially when the database is a commercial one and the user pays for the time during which he is connected to the database.

SUMMARY OF THE INVENTION

Accordingly, the object of the present invention is to mitigate the above-mentioned drawbacks and to provide a new method for extracting information form a database, which method enables the user to rapidly obtain information from the database without having any previous knowledge about the tabular structure of the database.

This object is achieved by a method and a device having the features recited in claim 1 and claim 13, respectively. Preferred embodiments of the invention are recited in the subclaims.

According to the present invention, the data records of the database are read into the primary memory of a computer so that the data may be processed off-line. The database may be stored on a secondary memory or be a remotely-stored database to which the computer is connected by a modem. It is to be understood that the database thus read into the primary memory may be a selected part of a larger database or a combination of two or more databases.

Furthermore, each different data element value of each data element type is assigned a binary code and the data records are stored in binary-coded form. On account of the binary coding, very rapid searches can be conducted in the tables. Moreover, redundant information can be removed, resulting in a reduced amount of data.

When it is detected that at least one data element in the database has been selected, e.g. when a user has "clicked" on that data element, the binary-coded data records are examined in order to find all data element values implied by the selection, and these data element values are kept track of in a status set. Thus, the method according to the invention does not keep track of which data records are implied by the selection of one or more data element values, but which data element values are implied by the selection, whereby the result of a selection may be presented to the user in a very clear and compact way.

The data element values obtained as a result of the method may either be presented directly to the user, or be further processed before presentation, or be used internally, e.g. as an input to another program.

The presentation of the result may have the form of a list of all data element values implied by the selection or a list of all data element values where the values implied by the selection are indicated in a first way and the values excluded by the selection are marked in a second way or in any other suitable form.

This method for extracting data from a database is very fast. The response times are linearly dependent on the amount of data in the database. Since all data element values of the data records implied by the selection of a data element are indicated, the user gets a good survey of all possible further selections, whereby the continued search for information from the database is facilitated.

BRIEF DESCRIPTION OF THE THE DRAWINGS

One embodiment of the present invention will now be described by way of examples, reference being made to the tables of Appendix A and to the drawings, in which.

DESCRIPTION OF PREFERRED EMBODIMENTS

Below, the basic mode or the OR mode of the method will be described with reference to FIGS. 1 and 2, as well as Tables 1–39 of Appendix A, which relate to a specific example.

Tables 1 and 2 show an example of a database containing information about different clothes. Table 1 contains data elements of the types "Clothes", "Color", "Size" and "ArtNo". Table 2 contains data elements of the types "ArtNo" and "Price". As appears from the Tables, the data elements defined by the type "Clothes" may assume the value "shirt" or the value "jeans". Similairly, the data elements of the type "color" may assume the values "blue" or "red", the data elements of the type "size" the values "32", "35", "39" or "40", the data elements of the type "ArtNo" the values "1001", "1003" or "2100" and the data elements of the type "price" the values "180" or "220".

Typically, the data element values are stored in the form of ASCII-coded strings.

The method according to the present invention is implemented by means of a computer program. In a first step of the method (see box 101 of FIG. 1), the program reads all data records in the database, for instance using a SELECT statement which selects all the tables of the database, i.e. Tables 1 and 2 in this case.

For each input table, the following steps (see box 102) are carried out. First, the column names, i.e. the data element types, of the table are successively read. Every time a new data element type appears, a data structure is instantiated for it. Then an internal table structure is instantiated to contain all the data records in binary form, whereupon the data records are successively read and binary-coded. For each data element value read, the data structure of the corresponding data element type is checked to establish if the value has previously been assigned a binary code. If so, that binary code is inserted in the proper place in the above-mentioned table structure. If not, the data element value is added to the data structures and assigned a new binary code, preferably the next one in ascending order, before being inserted in the table structure. In other words, for each data element type, a different binary code is assigned to each different data element value.

Tables 3–7 show the binary codes assigned to the different data element values in the database consisting of Tables 1 and 2. Tables 8 and 9 (see box 104) store all the data records of Tables 1 and 2, respectively, in binary form. Thus, Tables 8 and 9 are very compressed versions of Tables 1 and 2 of FIG. 1, enabling very rapid linear searches of the content of the tables to be carried out. For ease of reading, the binary codes of Tables 3–9 are represented by their decimal values.

When all the data records of an input table have been read and binary coded, the binary records of the above-mentioned internal table structure are sorted and duplicate data records are removed from the sorted table.

With suitable algorithms, the above-described steps of creating a binarified and sorted table may be performed in N 2log N time, where N is the amount of data in the table.

In a next step of the method, a frequency vector having one position for each different data element value, is created for each data element type. Furthermore, for each data element type, two Boolean strings having one position for each different data element value, are created. The first Boolean string for each data element type will be used for representing the selections made by the user. Below, it will be referred to as a user selection vector. The second Boolean string will be used for representing the status of the data element values. Below, it will be referred to as a status vector.

In this context, it should be mentioned that the status vector need not be a vector in the strict sense. It could also be a list of all data element values having a certain status, e.g. implied or excluded by a user selection, or any other suitable status set keeping track of the status of the data element values. However, the above-described use of status vector offers a simple implementiation of the status set.

The above-mentioned steps of the method are carried out only once. When they are completed, repeated searches may be carried out in the binarified tables.

In a next step of the method (see box 103), the content of the database is presented to the user on the display of the computer, preferably as shown in Tables 10–14, where the data element values of each data element type are shown in a different vertical list. Each list comprises a heading with the data element type. Each different value appears only once in the list. Of course, this mode of presentation may be used in connection with methods other than the present method.

It is now possible for the user to examine the information in the database by selecting one or more data element values in the list on the display. The selection may, for instance, be made by clicking on or touching one or more selected data element values. Alternatively, the selection can be entered by means of a keyboard.

When it is detected that a selection has been made by the user, the following steps are performed (see boxes 105–108). First, in the user selection vector corresponding to the list (or data element type) in which a data element value has been selected, a 1 (or TRUE) is inserted in the position corresponding to this data element value. A 0 (or FALSE) is inserted in all other positions of this user selection vector and in all other positions of the other user selection vectors. The result of these steps is shown in Tables 15–19.

Second, the user selection vector which corresponds to a list in which a data element value has been selected is copied to the corresponding status vector. The remaining status vectors which correspond to lists in which no data element values have been selected, are treated as if all possible data element values in the list were selected, since no selection means no restriction for this data element type, and thus a 1 is inserted in every position.

For instance, assume that the user has selected the value "shirt". Then a 1 is inserted in the first position and a 0 in the second position of the status vector regarding the list "clothes" as is shown in Table 20. All other Boolean strings are filled with 1s as is shown in Tables 21–24.

In this context, it should be mentioned that the user selection vectors are not mandatory for carrying out the method in the OR mode. The user selection could be kept track of in a separate vector or list, and the user selection encoded directly in the status vectors. However, the user selection vectors are used in the AND mode (see box 109).

Figure 1:
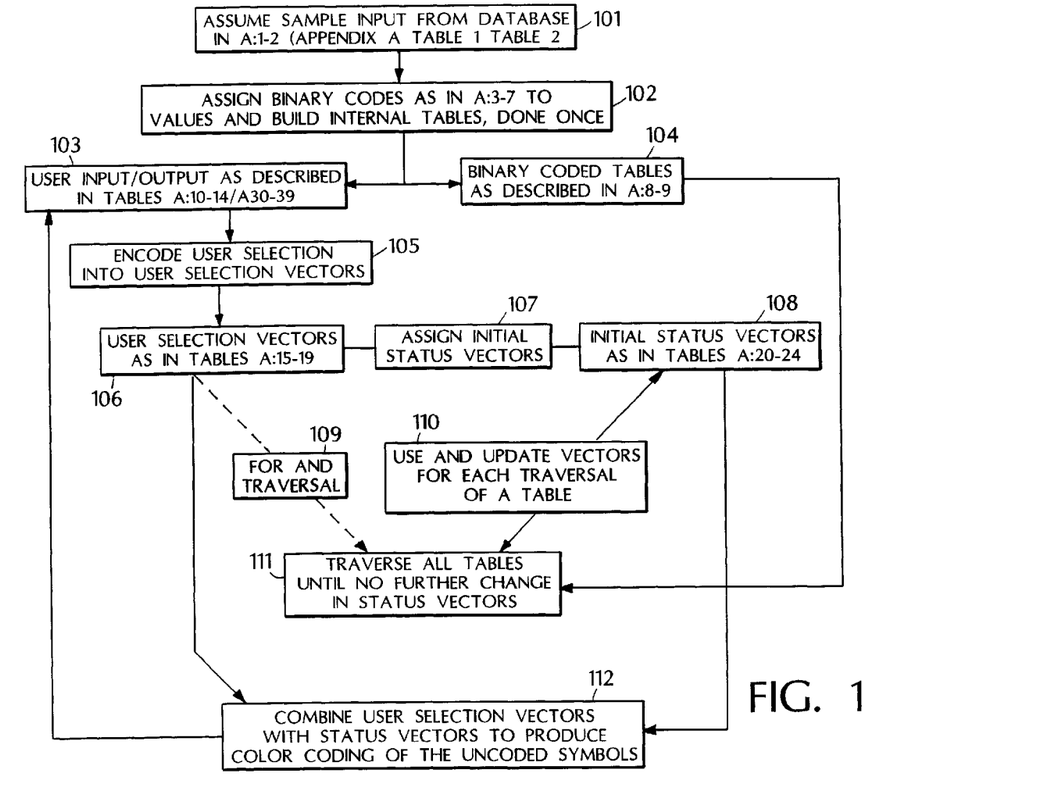
FIG. 1 is a diagram providing a general overview of the method according to the invention.
Figure 2:
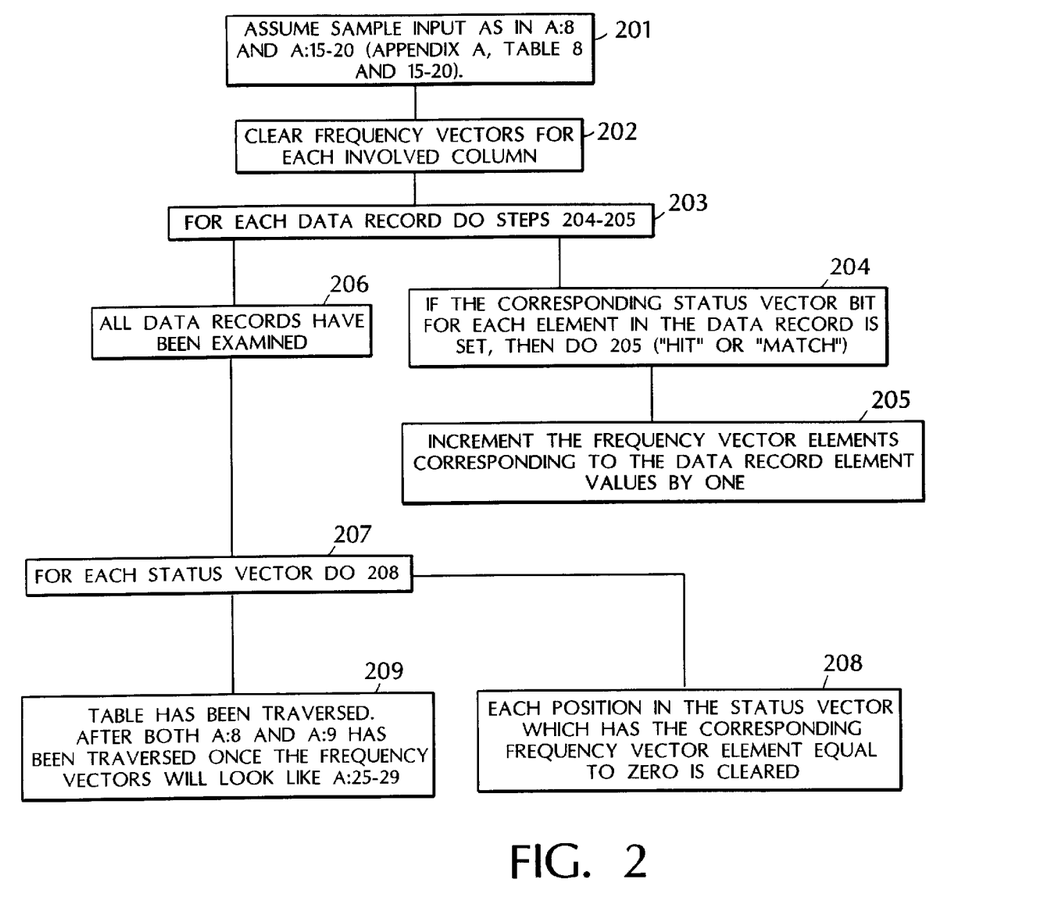
FIG. 2 is a diagram illustrating the traversal of a table in the OR mode of the method according to the invention.

In a next step, the program successively traverses the data records of the binarified table (see boxes 110–111 of FIG. 1 as well as FIG. 2). First, the frequency vectors are cleared (box 202). For each value of each data record, it checks whether the corresponding value of the corresponding status vector is 1 (box 203). If this is the case for all values of a data record, the program determines that this is a "hit" or "match" (box 204). Then the corresponding values of the corresponding frequency vectors are incremented by one (box 205).

When all data records of a table have been examined (box 206), the corresponding status vectors are updated by clearing (setting at 0) all positions for which the frequency count of the corresponding frequency vector is zero (boxes 207 and 208). Thus, the frequency vectors are utilized to find those data element values which are not implied by the selection.

If there are further tables in the database, the previous steps are repeated for these tables. When all the tables have been examined, the above-mentioned steps are repeated once more for all the tables. This procedure continues until the status vectors no longer change (box 111). Typically, only one or two traverses of each table are required. However, if the database comprises a single table, this table need of course be examined only once.

Tables 25–29 show the content of the frequency vectors, when Tables 8 and 9 have been traversed once after the selection of the data element value "shirt". The status vectors have a "1" in all elements for which the corresponding frequency vector element value is larger than zero and a "0" in all other elements.

The time needed for this examination of the tables is linearly proportional to the amount of data in the tables.

In the next step, the result of the selection is presented to the user (boxes 112 and 103). Advantageously, the data element values implied by the selection, i.e. the data element values of the data records matching the selection, are indicated in a first way, e.g. by a first color, and the data element values excluded by the selection in a different way, e.g. by a second color. These values are obtained from the status vectors. Furthermore, the selected value, which is obtained from the user selection vectors, is preferably indicated in yet another way. Tables 30–34 show how the result may be presented to the user in the above-mentioned case where the value "shirt" is selected. As appears from the tables, the sizes 32 and 35 as well as the ArtNo 2100 are excluded since there is no shirt of size 32 or 35, or of ArtNo 2100.

Now, if the user selects any of the still possible data element values, e.g. the size value "40", the frequency vectors are cleared and the above-mentioned steps are repeated to establish which data records match both the selection "shirt" and the selection "40". The result is shown in Tables 35–39. It is now evident that if the user wants a shirt of size 40, it must be a blue one at the price of 180.

The above example illustrates that there is an assumed logical AND operation between the different data element types. Clothes=shirt AND Size=40 AND Color=blue AND ArtNo=1001 AND Price=180. However the data element values of one and the same data element type are normally related by a logical OR operation. This is illustrated by the fact that before the second selection, size could be either "39" OR "40".

If the user selects an excluded value, at least all previous selections contradictory to the new selection change their status accordingly.

It is understood that the user may select more than one data element value at a time.

Preferably, the method according to the present invention allows for an AND functionality, i.e. the selection of a first data element value and a second data element value of the same data element type related by a logical AND operation. This is an operation that is both time-consuming and complicated to perform with SQL. With the method according to the present invention the user simply specifies a desired data element type as being of AND category.

Figure 3:
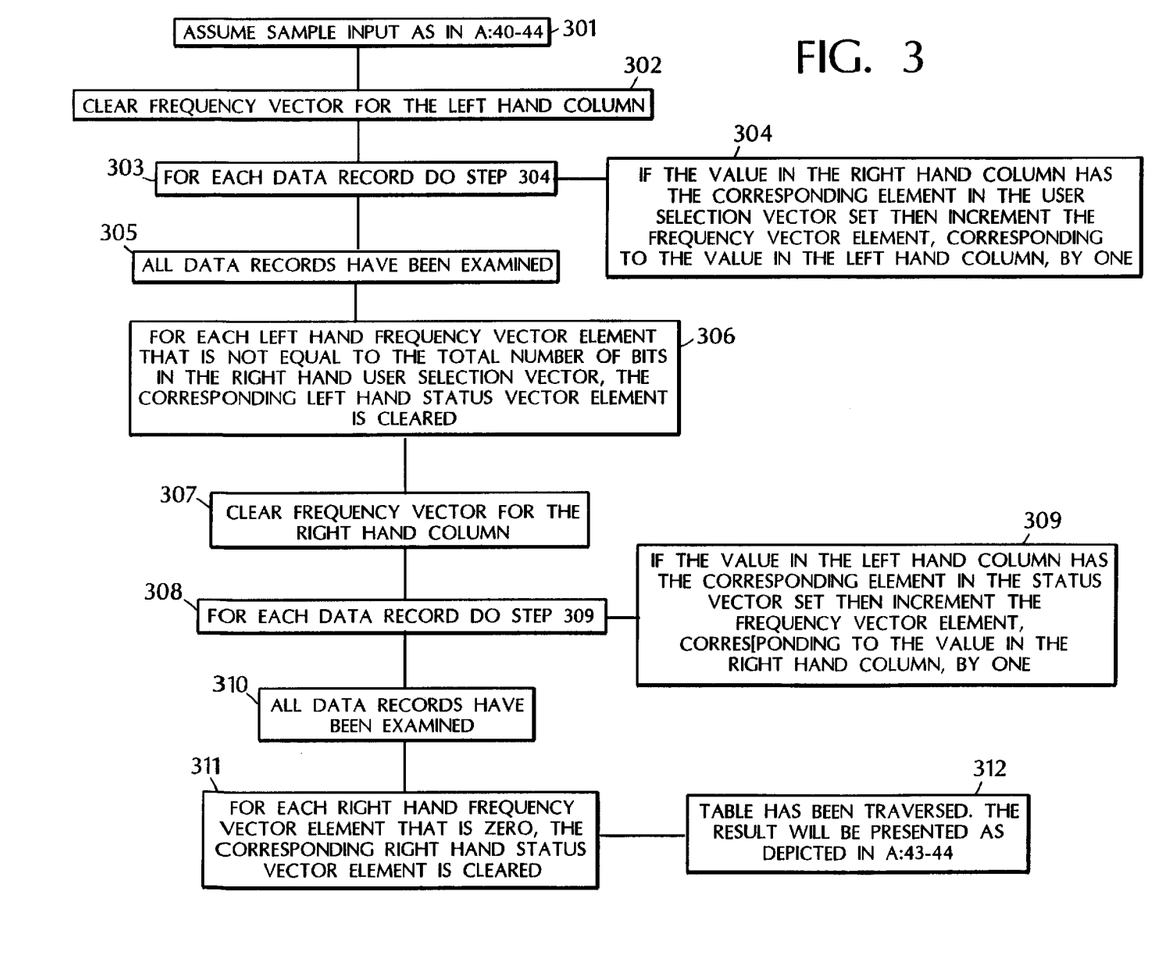
FIG. 3 is a diagram illustrating the traversal of a table in the AND mode of the method according to the invention.

The principle of AND is described with reference to Tables 40–46. Assume that seven different studies have been carried out in four different countries as shown in Tables 40–44 (box 301). Selecting Sweden will give the result shown in Tables 43 and 44. Studies 1003, 1005 and 1006 are excluded since no such studies have been performed in Sweden. Italy is also excluded since no study has been performed in both Sweden AND Italy.

When a data element type is specified as being of the AND category, the program first traverses the binarified table in the same way as described above where all the data element types were of the OR category, resulting in that studies 1001, 1002, 1004 and 1007 are found. In order to find any country excluded by the selection of Sweden, the binarified table is traversed once more with the above-mentioned studies found during the first traverse as input (selected values). This second traverse results in no hit for Italy, which, consequently, is excluded.

If the user in a next step selects Finland, the result will be as illustrated in Tables 45 and 46, i.e. only studies 1001 and 1007 are possible. The first traverse of the binarified tables is performed as described above with Sweden and Finland as selected values. This will result in six hits. To determine which of the hits satisfy the AND condition, the program checks the frequency vectors. Only the studies of which the frequency counts equal the number of selected countries, here two, satisfy the AND condition. More generally, if a first data element type has been specified as being of the AND category and a data element values of this type have been selected, only those data element values of a second type are possible where the frequency counts equal n.

A preferred embodiment of the AND mode of the method according to the invention will now be described in more detail with reference to FIG. 3.

Below, it is assumed that a binarified table corresponding to Table 40 has already been created and that user selection vectors, status vectors and frequency vectors have been instantiated (box 301). For ease of explanation, it is also assumed that the right-hand column of the table is the one specified as being of AND category.

When a user selection of one or more data element values of the data type specified as AND is detected, the user selection is encoded in the user selection vectors. Then, initial values are assigned to the status vectors. Unlike in the OR mode, all elements of the status vectors are set at "1", because a selection of one or more values in the AND list does not imply an exclusion of the other values in the same list. However, when traversing the binarified table for the first time in AND mode, the status vector corresponding to the left-hand column of the table is used as an input together with the user selection vector corresponding to the right-hand column of the binarified table.

Before traversing the binarified table for the first time, the frequency vector corresponding to the left-hand column of the table, is cleared (box 302). Then, for each data record of the table (box 303), the following step is carried out. If the user selection vector element corresponding to the data element value of the right-hand column of the table is set, then the frequency vector element corresponding to the data element value in the left-hand column is incremented by one (box 304).

When all the data records have been traversed (box 305), the following step is carried out. For each element in the frequency vector that correspond to the left-hand column of the table, the corresponding element of the left-hand status vector is cleared, if the frequency vector element does not equal the number of selections made by the user in the list of AND category, i.e. the total number of 1:s in the right-hand user selection vector (box 306).

The result of the above-mentioned steps are the data element values of the left-hand column of the table that are implied by the user selection. The status of the data element values of the right-hand column is not affected by the first traversal of the table.

In order to determine which data element values of the right-hand column are implied by the user selection, a second traversal of the binarified table is carried out with the updated status vector corresponding to the left-hand column of the table and the status vector corresponding to the right-hand column of the table as input.

First, the frequency vector of the right-hand column is cleared (box 307). Then, for each data record of the table (box 308), the following step is carried out. If the user selection vector element corresponding to the data element value of the left-hand column of the table is set, then the frequency vector element corresponding to the data element value in the right-hand column is incremented by one (box 309).

When all the data records have been examined (box 310), those elements of the right-hand status vector for which the corresponding element of the right-hand frequency vector is zero, are cleared. The status vector elements which are "1"

do now indicate the data element values implied by the user selection and the result may be presented as in Tables 43 and 44, or 45 and 46.

Above, the AND mode has been described with reference to a two-column table. However, AND may also be performed in relation to one or more columns in a multi-column table by creating a two-column table from the multi-column table. When AND is to be performed in relation to one column, this column and the AND column are extracted from the multi-column table to create the two-column table, and when AND is to be performed in relation to two or more columns, these columns are synthesized into a new column which is used together with the AND column to create the two-column table.

Sometimes, a database only contains the exceptions in a table, it being understood that all other relations follow a standard rule. To reflect this, an extra data record in which one or more, but not all, data element values are an asterisk (*), can be added at the end of the table. The asterisk signifies that the data element value is unspecified or left open. Information about this data record, which is called a "wild-card" record or a default record, is stored separately. On the basis of this information, the program knows that the table contains a wild-card data record and that the table is to be treated accordingly.

Consider the example in Tables 47 and 48. Table 47 contains different makes of cars and the different countries of manufacture. Table 48 contains different cylinder volumes of different car makes. Table 48 contains more car makes than Table 47, it being understood that car makes not mentioned in Table 47 are Japanese. To include this implied information in the tables read into the primary memory of the computer, a wild-card data record may be added in Table 47, the value of the make being an asterisk and the value of the country being Japan.

When the program has binarified a table including a wild-card record, it sorts the table in such a manner that data records having identical values in the wild-card column are adjacent to each other.

In a next step, the program creates a vector having the same number of positions as the number of data records in the table. A 0 is inserted in the first position of the vector. When the table is traversed, the element in the vector corresponding to the data record being examined is set at the same value as the previous value of the vector if the values of the wild-card columns are identical with the values of these columns of the previous data record, and is set at the same value+1, if not identical. When the binarified table has been traversed, the number of unique hits is counted, only the hits having a different value in the above-mentioned vector being taken into account. If the number of hits equals the product of the number of selected values in each wild-card column, then, and only then, is the wild-card data record excluded.

For instance, assume that the cylinder volume of the value "1.4" is selected in Table 48, then the car makes "Ford" and "SAAB" are implied. This in turn results in two unique hits in Table 47, since the values of the wild-card column are different. Since there are two values selected in the wild-card column and there are two hits, the wild-card data record is excluded.

If the cylinder volume value of "2.0" is instead selected, the car makes "Volvo" and "Mazda" are implied and selected as input for Table 47. However, these selected values of the wild-card column do not result in more than one hit (Volvo-Sweden). Consequently, the wild-card data record is still possible.

The present invention increases the possible applications of existing databases. For instance, many companies have a number of databases in different database management systems running on different computers on the network. However, an individual user often needs only a fraction of the information in each of the different databases. By using the present invention, the user can import relevant data record tables from the different databases and create a completely new and homogeneous view of e.g. a project without any specific programming.

Furthermore, he may also connect local data or comments to the data from the databases. Since the processing of data is done locally, local data will be processed and given the same priority as central data. This makes it possible to have views that are a combination of local data and central data.

Moreover, multimedia including video, sound and color pictures are often not easily handles in traditional databases. Neither are they apt to be transmitted over normal computer networks. The present invention makes it possible to connect multimedia that reside elsewhere, e.g. on a locally-connected CD-player. The relevant multimedia filename and format are simply given in a table in connection with a certain value. When the value is selected, the associated multimedia presentation can be initiated.

Appendix A

TABLE 1

| Clothes | Color | Size | ArtNo |
|---------|-------|------|-------|
| shirt | blue | 39 | 1001 |
| shirt | blue | 40 | 1001 |
| shirt | red | 39 | 1003 |
| jeans | blue | 32 | 2100 |
| jeans | blue | 35 | 2100 |

TABLE 2

| ArtNo | Price |
|-------|-------|
| 1001 | 180 |
| 1003 | 220 |
| 2100 | 180 |

TABLE 3

| Clothes | |
|---------|---|
| shirt | 0 |
| jeans | 1 |

TABLE 4

| Color | |
|-------|---|
| blue | 0 |
| red | 1 |

TABLE 5

| Size | |
|---|---|
| 39 | 0 |
| 40 | 1 |
| 32 | 2 |
| 35 | 3 |

TABLE 6

| ArtNo | |
|---|---|
| 1001 | 0 |
| 1003 | 1 |
| 2100 | 2 |

TABLE 7

| Price | |
|---|---|
| 180 | 0 |
| 220 | 1 |

TABLE 8

| Clothes | Color | Size | ArtNo |
|---|---|---|---|
| 0 | 0 | 0 | 0 |
| 0 | 0 | 1 | 0 |
| 0 | 1 | 0 | 1 |
| 1 | 0 | 2 | 2 |
| 1 | 0 | 3 | 2 |

TABLE 9

| ArtNo | Price |
|---|---|
| 0 | 0 |
| 1 | 1 |
| 2 | 0 |

TABLE 10

| Clothes |
|---|
| shirt |
| jeans |

TABLE 11

| Size |
|---|
| 39 |
| 40 |
| 32 |
| 35 |

TABLE 12

| Color |
|---|
| blue |
| red |

TABLE 13

| Price |
|---|
| 180 |
| 220 |

TABLE 14

| ArtNo |
|---|
| 1001 |
| 1003 |
| 2100 |

Table 15–29 refers to a selection of "shirt" in the Clothes data element type.

TABLE 15

User selction vector - Clothes

| 1 | 0 |
|---|---|

TABLE 16

User selection vector - Size

| 0 | 0 | 0 | 0 |
|---|---|---|---|

TABLE 17

User selection vector - Color

| 0 | 0 |
|---|---|

TABLE 18

User selection vector - Price

| 0 | 0 |
|---|---|

TABLE 19

User selection vector - ArtNo

| 0 | 0 | 0 |
|---|---|---|

TABLE 20

Initial status vector - Clothes

| 1 | 0 |
|---|---|

TABLE 21

Initial status vector - Size

| 1 | 1 | 1 | 1 |
|---|---|---|---|

TABLE 22

Initial status vector - Color

| 1 | 1 |
|---|---|

TABLE 23

Initial status vector - Price

| 1 | 1 |
|---|---|

TABLE 24

Initial status vector - ArtNo

| 1 | 1 | 1 |
|---|---|---|

TABLE 25

Frequency vector - Clothes

| 3 | 0 |
|---|---|

TABLE 26

Frequency vector - Size

| 2 | 1 | 0 | 0 |
|---|---|---|---|

TABLE 27

Frequency vector - Color

| 2 | 1 |
|---|---|

TABLE 28

Frequency vector - Price

| 1 | 1 |
|---|---|

TABLE 29

Frequency vector - ArtNo

| 1 | 1 | 0 |
|---|---|---|

Tables 30 to 34 refers to a possible user interface after selecting "shirt" from the Clothes data element type.

TABLE 30

TABLE 31

| 39 |
|----|
| 40 |

TABLE 32

Color blue
red

TABLE 33

Price 180
220

TABLE 34

| ArtNo | Colorcode |
|-------|-----------|
| 1001  | optional  |
| 1003  | selected  |

Tables 35–39 refers to a possible user interface after selecting "shirt" from the Clothes and "40" from the Size data element type.

TABLE 35

TABLE 36

| Size |
|---|
| |
| |
| |
| 40 |

TABLE 37

| Color |
|---|
| blue |
| |

TABLE 38

| Price |
|---|
| 180 |
| |

TABLE 39

| ArtNo | Colorcode |
|---|---|
| 1001 | optional |
| | selected |
| | |

TABLE 40

| Study | Country |
|---|---|
| 1001 | Sweden |
| 1001 | Finland |
| 1002 | Sweden |
| 1002 | Denmark |
| 1003 | Denmark |
| 1003 | Finland |
| 1004 | Sweden |
| 1005 | Finland |
| 1005 | Italy |
| 1006 | Denmark |
| 1006 | Italy |
| 1007 | Sweden |
| 1007 | Finland |
| 1007 | Denmark |

TABLE 41

| Study |
|---|
| 1001 |
| 1002 |
| 1003 |
| 1004 |
| 1005 |

TABLE 41-continued

| Study |
|---|
| 1006 |
| 1007 |

TABLE 42

| Country |
|---|
| Sweden |
| Finland |
| Denmark |
| Italy |

Tables 43 and 44 refers to a possible user interface after selecting "Sweden" from the Country data element type in AND mode.

TABLE 43

| Study |
|---|
| 1001 |
| 1002 |
| |
| 1004 |
| |
| |
| 1007 |

TABLE 44

| &Country | Colorcode |
|---|---|
| Sweden | optional |
| Finland | selected |
| Denmark | |
| | |

Tables 45 and 46 refers to a possible user interface of selecting "Sweden" and "Finland" from the Country table in AND mode.

TABLE 45

| Study |
|---|
| 1001 |
| |
| |
| |
| |
| |
| 1007 |

TABLE 46

| &Country | Colorcode |
|---|---|
| Sweden | optional |
| Finland | selected |
| Denmark | |
| | |

TABLE 47

| Make | Country |
|---|---|
| Volvo | Sweden |
| SAAB | Sweden |
| Ford | USA |
| Ford | Europe |
| BMW | Germany |
| * | Japan |

TABLE 48

| Cylinder Volume | Make |
|---|---|
| 0.8 | Toyota |
| 0.9 | Mazda |
| 1.0 | Toyota |
| 1.0 | Honda |
| 1.4 | Ford |
| 1.4 | SAAB |
| 2.0 | Volvo |
| 2.0 | Mazda |
| 2.8 | BMW |

What is claimed is:

1. A method for extracting information from a database, which comprises a plurality of data records, each data record comprising at least two data elements, each of the data elements being defined by a data element type and a data element value, the data element values for at least some of the data elements being different and the data element values for at least some of the data elements being the same, the method being characterized by the steps of assigning a binary code to each data element value of each data element type, different binary codes being assigned to different data element values, the same binary codes being assigned to the same data element values, the assignment of binary codes to different data element values being made arbitrarily with respect to the data elements;

storing the data records in a binary-coded form that uses the assigned binary codes to express the data element values of the data records;

detecting a selection of at least one of the data element values;

examining the binary-coded data records to obtain all data element values that are implied by the selection; and keeping track, in a status set, of all data element values implied by the selection.

2. A method as set forth in claim 1, characterised by the further step of presenting at least those data element values implied by the selection to the user in human-readable form.

3. A method as set forth in claim 1, characterised in that for each further detection of the selection of at least one of the data element values implied by the previous selection, the step of examining the binary-coded data records and the step of keeping track of all data element values implied by the selection are repeated.

4. A method as set forth in claim 1, characterised in that all data element values which are not excluded by the detected selection are initially included in the status set and in that said examining step comprises the steps of finding all data records having data element values which all belong to the status set and excluding from the status set those data element values which do not appear in any of the data records found in the finding step.

5. A method as set forth in claim 4, characterised in that the status set comprises one status vector for each data element type, each status vector having one element for each data element value of the corresponding data element type and that said step of examining comprises the step of setting each element of the status vectors corresponding to a data element value implied by said selection of at least one of the data element values at a first value and each element of the status vectors corresponding to a data element value not implied by said selection at a second value.

6. A method as set forth in claim 2, characterised by the further step of providing one frequency vector for each data element type, each frequency vector having one element for each data element value of the corresponding data element type, said examining step comprising the step of incrementing by one the frequency vector elements corresponding to the data element values of those data records in which all data element values belong to the status set.

7. A method as set forth in claim 6, characterised by the further step of eliminating, from the status set, each data element value corresponding to a frequency vector element having a frequency count which is zero when all the data records have been examined.

8. A method as set forth in claim 2, wherein the data records of the database are organized in two or more tables, characterised in that the data records of the tables are examined repetitively until the elements of the status set no longer change.

9. A method as set forth in claim 6, characterised in that the method comprises the step of detecting that the data element values of a first data element type are related by a logical AND, and that said step of detecting the selection of at least one of the data element values comprises the detection of the selection of n data element values of said first data element type, and that the step of obtaining the data element values implied by the selection comprises the step of obtaining those data element values of a second data element type which have a frequency vector element value of n.

10. A method as set forth in claim 9, characterised by the further step of using said obtained data element values of the second data element type as a selection to obtain the data element values of the first data element type excluded by said selection of n data element values of the first data element type.

11. A method as set forth in claim 2, characterised in that said plurality of data records read into the primary memory comprise one default data record, in which the data element value of at least one data element type is unspecified, the remaining data records being ordinary data records of which all data element values are specified, and that said step of examining comprises the step of determining that the default data record is not a data record implied by said selection of at least one of the data element values, if, and only if, the number of data records implied by said selection and having a data element value of the same type as the unspecified data element value that is unique, equals the number of selected data element values of the same data element type as the unspecified value.

13. A method as set forth in claim 2, characterised in that said plurality of data records read into the primary memory of the computer are presented on the display of the computer in the form of a plurality of lists, each list containing the data element values of a different data element type and each data element value appearing only once in each list, data element values implied by the selection being indicated in a first way and data element values not implied by the selection being indicated in a second way.

13. A device for extracting information from a database, which comprises a plurality of data records, each data record comprising at least two data elements each of the data elements being defined by a data element type and a data element value, the data element values for at least some of the data elements being different and the data element values for at least some of the data elements being the same, the device being characterized by means for assigning a binary code to each data element value of each data element type, different binary codes being assigned to different data element values, the same binary codes being assigned to the same data element values, the assignment of binary codes to different data element values being made arbitrarily with respect to the data elements;

storing the data records in a binary-coded form that uses the assigned binary-codes to express the data element values of the data records;

means for detecting the selection of at least one of the data element values;

means for examining the binary-coded data records to obtain all data element values that are implied by the selection; and means for keeping track, in a status set, of all data element values implied by the selection.

* * * * *